(12) United States Patent
Kondo et al.

(10) Patent No.: US 6,853,495 B2
(45) Date of Patent: Feb. 8, 2005

(54) WIDE-ANGLE LENS SYSTEM

(75) Inventors: Yasuhiro Kondo, Nagoya (JP); Kazuyoshi Yamada, Kasugai (JP)

(73) Assignee: Elmo Company, Limited (JP)

( * ) Notice: Subject to any disclaimer, the term of this patent is extended or adjusted under 35 U.S.C. 154(b) by 35 days.

(21) Appl. No.: 10/329,655

(22) Filed: Dec. 23, 2002

(65) Prior Publication Data

US 2003/0117721 A1 Jun. 26, 2003

(30) Foreign Application Priority Data

Dec. 25, 2001 (JP) ........................ 2001-390970

(51) Int. Cl.$^7$ ................. G02B 15/14; G02B 9/04; G02B 13/04

(52) U.S. Cl. ............ 359/680; 359/689; 359/691; 359/716; 359/717; 359/740; 359/749; 359/753; 359/793

(58) Field of Search ............... 359/680, 683, 359/689, 691, 716, 717, 740, 749, 753, 793

(56) References Cited

U.S. PATENT DOCUMENTS 6,154,322 A * 11/2000 Nakayama .......... 359/691
6,298,172 B1 * 10/2001 Arney et al. .......... 382/293
6,377,404 B1 * 4/2002 Goosey, Jr. .......... 359/682
6,621,645 B2 * 9/2003 Sato .......... 359/749

* cited by examiner

*Primary Examiner*—Evelyn A. Lester
(74) *Attorney, Agent, or Firm*—Ostrolenk, Faber, Gerb & Soffen, LLP

(57) ABSTRACT

A wide-angle lens system having a long back focal length, disposed in front of a ⅓" CCD camera and the focal length (f) for all lens groups is 3.0 mm, the F-number is 3.0 and the half-field angle is 46°. The following conditions are met by the first lens group: $1 \leq d/d3 < 1.2$; $R3/R2=0.99$; and $d2/f = 0.03$. Here, (d) indicates the thickness of the second lens along the normal line at a given distance from the optical axis within the maximum effective diameter of the object side convex surface of the lens. d3 is the thickness of the second lens along the optical axis.

9 Claims, 13 Drawing Sheets

Fig.2

| SURFACE NUMBER # | R | d | Nd | $\nu$d |
|---|---|---|---|---|
| 1 | 23.8096 | 0.800 | 1.72916 | 54.7 |
| 2 | 7.0678 | 0.100 | | |
| 3 | 7.0000 | 1.700 | 1.62299 | 58.2 |
| *4 | 3.5000 | 7.464 | | |
| 5 | 4.7499 | 1.200 | 1.84666 | 23.8 |
| 6 | 2.9234 | 0.486 | | |
| 7 | 4.5797 | 4.000 | 1.84666 | 23.8 |
| 8 | 15.5569 | 0.150 | | |
| 9 | ∞ | 0.150 | | |
| 10 | -19.5815 | 2.869 | 1.60300 | 65.5 |
| 11 | -4.1131 | 0.150 | | |
| 12 | 16.9386 | 2.127 | 1.60311 | 60.7 |
| 13 | -2.9773 | 1.022 | 1.84666 | 23.8 |
| 14 | -7.8310 | - | | |

ASPHERICAL SURFACE DATA

| ASPHERICAL SURFACE NUMBER | 4 |
|---|---|
| K | -0.878765 |
| A4 | 0.297597E-03 |
| A6 | -0.350702E-04 |
| A8 | 0.185863E-05 |
| A10 | -0.396725E-07 |

Fig.6

| SURFACE NUMBER # | R | d | Nd | $\nu$d |
|---|---|---|---|---|
| 1 | 31.7454 | 1.067 | 1.72916 | 54.7 |
| 2 | 9.4235 | 0.133 | | |
| 3 | 9.3331 | 2.267 | 1.62299 | 58.2 |
| *4 | 4.6666 | 9.952 | | |
| 5 | 6.3330 | 1.600 | 1.84666 | 23.8 |
| 6 | 3.8978 | 0.648 | | |
| 7 | 6.1061 | 5.333 | 1.84666 | 23.8 |
| 8 | 20.7420 | 0.200 | | |
| 9 | ∞ | 0.200 | | |
| 10 | -26.1081 | 3.826 | 1.60300 | 65.5 |
| 11 | -5.4840 | 0.200 | | |
| 12 | 22.5843 | 2.836 | 1.60311 | 60.7 |
| 13 | -3.9696 | 1.363 | 1.84666 | 23.8 |
| 14 | -10.4411 | - | | |

ASPHERICAL SURFACE DATA

| ASPHERICAL SURFACE NUMBER | 4 |
|---|---|
| K | -0.878765 |
| A4 | 0.125558E-03 |
| A6 | -0.832337E-05 |
| A8 | 0.248140E-06 |
| A10 | -0.297947E-08 |

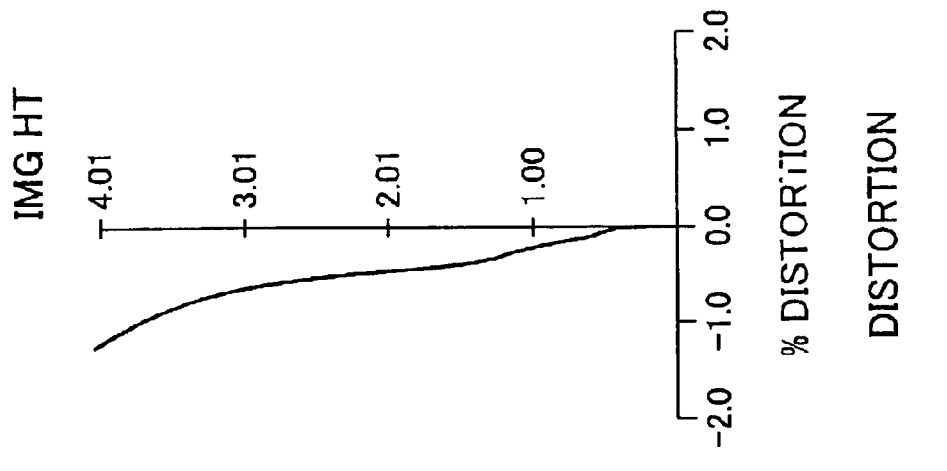
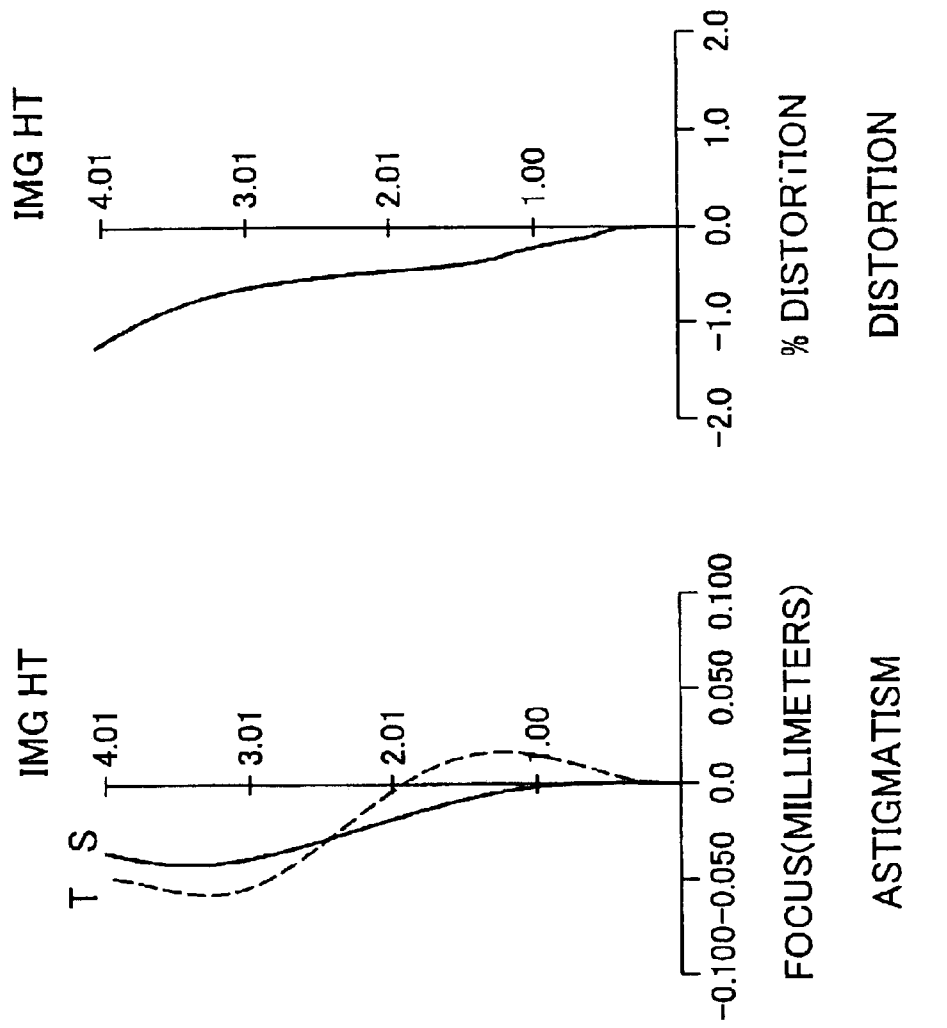
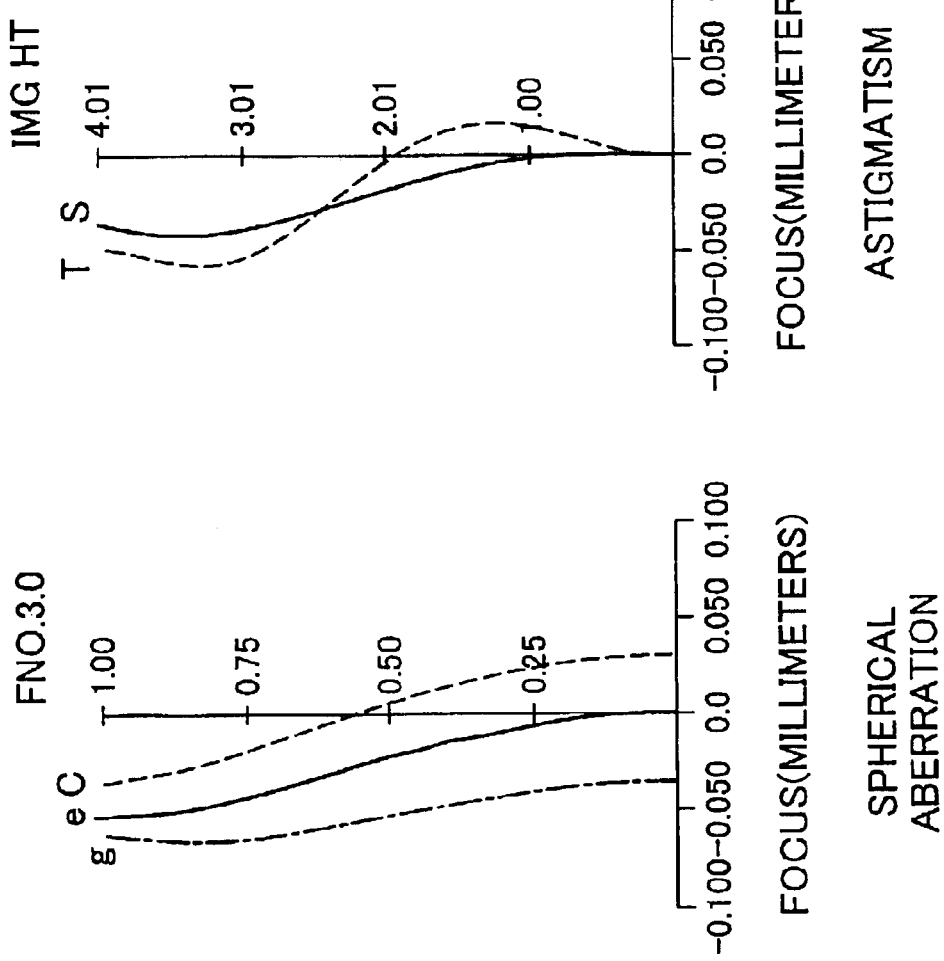

Fig.9

| SURFACE NUMBER # | R | d | Nd | νd |
|---|---|---|---|---|
| 1 | 20.5645 | 0.800 | 1.72916 | 54.7 |
| 2 | 7.0561 | 0.100 | | |
| 3 | 7.0000 | 1.700 | 1.4918 | 57.2 |
| *4 | 3.5000 | 5.514 | | |
| 5 | 6.4111 | 1.000 | 1.72916 | 54.7 |
| 6 | 3.8257 | 1.021 | | |
| 7 | 9.2428 | 4.000 | 1.76180 | 26.5 |
| 8 | −34.8670 | 2.624 | | |
| 9 | ∞ | 1.000 | | |
| 10 | −47.6763 | 1.500 | 1.64000 | 60.1 |
| 11 | −5.7347 | 0.150 | | |
| 12 | 14.5851 | 2.500 | 1.64000 | 60.1 |
| 13 | −3.2743 | 1.700 | 1.84666 | 23.8 |
| 14 | −9.5314 | − | | |

ASPHERICAL SURFACE DATA

| ASPHERICAL SURFACE NUMBER | 4 |
|---|---|
| K | −0.724178 |
| A4 | −0.854329E−04 |
| A6 | −0.423182E−04 |
| A8 | 0.129662E−05 |
| A10 | −0.399365E−07 |

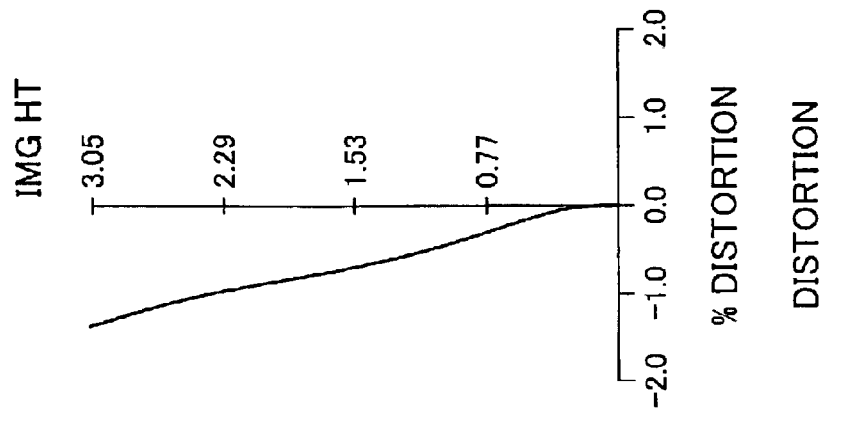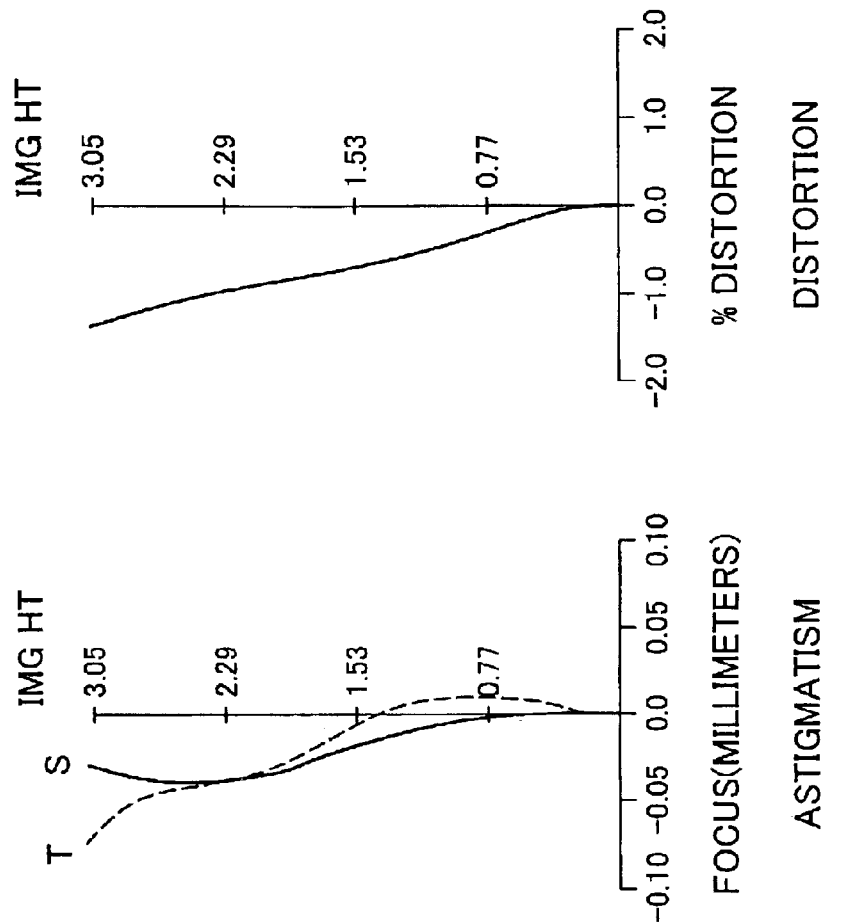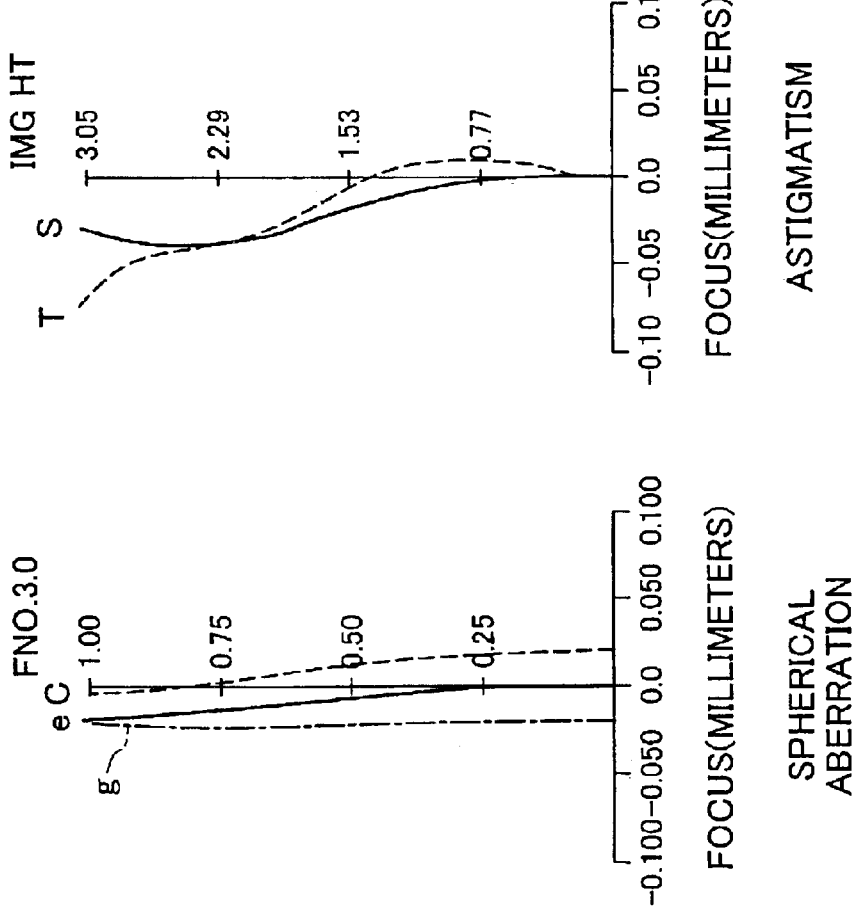

(PRIOR ART)

SPHERICAL ABERRATION   ASTIGMATISM   DISTORTION (PRIOR ART)

WIDE-ANGLE LENS SYSTEM

BACKGROUND OF THE INVENTION

1. Field of the Invention

The present invention relates to a wide-angle lens system, as well as to a manufacturing method therefor and to optical devices in which the wide-angle lens system is used, and more particularly to a wide-angle lens system that includes a first lens group that is located on the object side and has an overall negative refractive power and a second lens group that is located on the image side of the first lens group and has an overall positive refractive power, as well as to a technology pertaining thereto.

2. Description of the Related Art

Wide-angle lens systems that have a large imaging area are used not only for a special purpose, such as for use as a fish-eye lens, but are widely used in the imaging systems of such devices as document display devices that obtain images of documents from a relatively close distance. The required specifications for such wide-angle lens systems include not only a large imaging area, but also adequate corner illumination, small distortion, a compact configuration, and a small number of easily manufactured component lenses. Various types of wide-angle lens systems that meet these criteria and include a zoom function as well have been proposed (see, for example, Japanese Patent Laid-Open No. H09-21946).

A widely used type of wide-angle lens system of the conventional art is a so-called retrofocus type lens system comprising a combination of a first lens group having a negative refractive power and a second lens group having a positive refractive power, and various combinations of lenses have been proposed (see, for example, Japanese Patent Laid-Open No. H11-30743). This type of lens system is characterized in that it has a long back focal length and a relatively high amount of corner illumination.

However, the retrofocus type wide-angle lens system has the problem of high negative distortion, and depending on the lens selection and design, it also entails the problems of significant coma aberration and astigmatism. In particular, as the field angle increases, aberration increases and correction becomes necessary. FIG. 13 is an explanatory drawing showing one example of a retrofocus lens system used in the conventional art. FIG. 14 shows the characteristics of this lens system with regard to spherical aberration, astigmatism and distortion. As shown in the figure, aberration, particularly distortion, is extremely high in this type of lens system, and a substantial amount of distortion occurs in the captured image in the periphery of the imaging area. The parameters for the various types of aberration shown in FIG. 14 are explained in detail in comparison with the characteristics of the wide-angle lens system of an embodiment of the present invention.

While these types of aberration can be eliminated to some extent using such methods as increasing the number of lenses or making a lens surface aspherical, if the number of lenses is increased, the construction becomes complex, making the lens system more difficult and costly to manufacture. Where an aspherical lens is to be used in order to efficiently correct for distortion, because the lens configuration entails significant variation in lens thickness from the optical axis to the periphery of the lens, it is difficult to manufacture the lens with precision.

An object of the present invention is to resolve these problems and to provide a wide-angle lens system that offers small distortion yet does not increase the number of lenses and uses an aspherical lens that is easy to manufacture.

SUMMARY OF THE INVENTION

The wide-angle lens system of the present invention that at least partially resolves the above-described problems is a wide-angle lens system comprising a first lens group that is located on the object side and has an overall negative refractive power; and a second lens group that is located on the image side of the first lens group and has an overall positive refractive power, wherein said first lens group comprises first and second lenses formed as meniscus lenses that are disposed next to each other in that order from the object side and are convex on the object side, the image side concave surface of said second lens is aspherical and the variation in the thickness (d) of said lens within its effective radius is set to fall within a first prescribed range, the divergence between the radius of curvature R12 on the image side of said first lens and the radius of curvature R21 on the object side of said second lens is set to fall within a second prescribed range, and the deviation between the difference d2 between the radii of curvature of said first and second lenses along the optical axis and the focal length (f) of the lens system comprising said first lens group and said second lens group is set so as not to exceed a prescribed value.

This wide-angle lens system described above may be constructed such that the first lens group comprises a minimum of two lenses, and the variation in the thickness in the radial direction of the second lens comprising a meniscus lens with an aspherical concave surface can be maintained within a narrow range. As a result, in the wide-angle lens system of the present invention, the construction of the first lens group is simple, the manufacturing and assembly of the lenses forming the first lens group is easy, and aberration such as distortion can be kept small.

The effective radius of the second lens of the first lens group can be defined using the lens surface on the light incidence side, i.e., on the object side. In this wide-angle lens system, an aperture may be located in the second lens group.

For the wide-angle lens system of the present invention, a construction may be adopted wherein where the thickness of the second lens along the optical axis is deemed d0 and the thickness along the normal line at a given distance from the optical axis within the effective radius is deemed (d), the variation in the thickness of the second lens is defined as d/d0, for which the first prescribed range is 0.8 to 1.2 (0.8<d/d0<1.2), the divergence between the radii of curvature of the first and second lenses is defined as R21/R12, for which the second prescribed range is 0.9 to 1.1 (0.9<R2/R1<1.1), and the deviation between the difference d2 between the radii of curvature of the first and second lenses along the optical axis and the focal length (f) is defined as d2/f, for which the prescribed value is 0.2 (d2/f<0.2).

In the wide-angle lens system in which each value is controlled within the value ranges described above, the various types of aberration can be reduced significantly. For example, distortion can be limited to ±2% or less, and astigmatism can be limited to ±0.05 mm or less within the effective radius of the second lens.

In this wide-angle lens system, the second lens group can have various constructions so long as it has an overall positive refractive power. For example, the plurality of lenses that comprise the second lens group may consist of two lens groups that are separated by an aperture. A zoom function may be added by adjusting the distance between the first and second lens groups.

Glass, synthetic resin or another optical material may be used as the material from which the first and second lenses of the first lens group are formed, so long as the optical requirements regarding the lenses are met. In particular, if the first lens is formed from glass by polishing, it is easy to ensure that the object side surface thereof, which is exposed to the atmosphere, satisfies the durability requirement, and a precise configuration can be achieved by polishing. The second lens of the first lens group may be formed from synthetic resin by molding. Naturally, it may be manufactured by molding glass. Because the image side surface of the second lens is formed as an aspherical surface, if the second lens is manufactured by molding of a translucent material such as resin or glass, the cost and difficulty of manufacturing the second lens, which comprises an aspherical lens, can be reduced.

The wide-angle lens system manufacturing method of the present invention is a method for manufacturing a wide-angle lens system that includes a first lens group that is located on the object side and has an overall negative refractive power and a second lens group that is located on the image side of the first lens group and has an overall positive refractive power, wherein the first lens group is composed of a first lens that is disposed on the object side and a second lens that has an aspherical concave surface and a thickness (d) within the effective radius of the lens that is set to fall within a first prescribed range, both such lenses being meniscus lenses, the first and second lenses are formed such that the divergence between the radius of curvature R12 on the image side of the first lens and the radius of curvature R21 on the object side of the second lens is set to fall within a second prescribed range and the deviation between the difference d2 between the radii of curvature of the first and second lenses along the optical axis and the focal length (f) of the lens system comprising the first lens group and the second lens group is set so as not to exceed a prescribed value, the first lens group is formed by arranging the first and second lenses in an adjacent fashion in that order from the object side such that they are convex on the object side, and the second lens group is disposed on the image side of the first lens group while being separated from the first lens group by a prescribed distance.

According to this manufacturing method, the number of lenses comprising the first lens group can be set to a minimum of two, and because the thickness of the second lens having an aspherical concave surface is set to fall within a first prescribed range, the second lens can be manufactured easily. Consequently, the manufacturing process for the wide-angle lens system as a whole can be made simple.

The wide-angle lens system described above can be used in various optical devices. The optical device of the present invention comprises an optical device that comprises a wide-angle lens system and a CCD camera disposed therebehind, wherein the wide-angle lens system comprises a first lens group that is located on the object side and has an overall negative refractive power and a second lens group that is located on the image side of the first lens group and has an overall positive refractive power, the first lens group comprises first and second lenses formed as meniscus lenses that are disposed in an adjacent fashion in that order from the object side such that they are convex on the object side, the image side concave surface of the second lens is aspherical and the variation in the thickness (d) within the effective radius of such lens is set to fall within a first prescribed range, the divergence between the radius of curvature R12 on the image side of the first lens and the radius of curvature R21 on the object side of the second lens is set to fall within a second prescribed range, and the deviation between the difference d2 between the radii of curvature of the first and second lenses along the optical axis and the focal length (f) of the lens system comprising the first lens group and the second lens group is set so as not to exceed a prescribed value.

Because the required back focal length can be maintained by the wide-angle lens system comprising the optical device, a CCD camera can be disposed behind the wide-angle lens system. Moreover, images having little aberration can be obtained. In addition, the first lens group of the wide-angle lens system can comprise a minimum of two lenses, and the variation in the thickness in the radial direction of the second lens comprising a meniscus lens with an aspherical concave surface can be maintained within a narrow range. As a result, the construction of the first lens group of the wide-angle lens system is simple, the manufacturing and assembly of the lenses forming the first lens group is easy, and aberration such as distortion can be kept small, enabling sharp, non-blurred images to be obtained.

As such an optical device, a document display device that comprises an imaging unit comprising a wide-angle lens system and a CCD camera, a document platform disposed below the imaging unit, and a support unit that supports the imaging unit such that at least part of the document platform can be imaged can be imagined.

Because the document display device has a wide-angle imaging area and the imaged object is often a document containing text or the like, the ability to obtain images that have small blurring or distortion offers a considerable advantage.

For the wide-angle lens system of this type of optical device as well, a construction may be adopted wherein where the thickness of the second lens along the optical axis is deemed d0 and the thickness along the normal line at a given distance from the optical axis within the effective radius is deemed (d), the variation in the thickness of the second lens is defined as d/d0, for which the first prescribed range is 0.8 to 1.2 (0.8<d/d0<1.2), the divergence between the radii of curvature of the first and second lenses is defined as R21/R12, for which the second prescribed range is 0.9 to 1.1 (0.9<R21/R1<1.1), and the deviation between the difference d2 between the radii of curvature of the first and second lenses along the optical axis and the focal length (f) is defined as d2/f, for which the prescribed value is 0.2 (d2/f<0.2). In the wide-angle lens system in which each value is controlled within the value ranges described above, the various types of aberration can be reduced significantly. For example, distortion can be limited to ±2% or less and astigmatism can be limited to ±0.05 mm or less within the effective radius of the second lens. Therefore, it can be ensured that the optical device offers adequate performance.

BRIEF DESCRIPTION OF THE DRAWINGS

FIG. 2 is an explanatory drawing showing the radius of curvature and other parameters pertaining to the wide-angle lens system 100 of the first embodiment;

FIG. 6 is an explanatory drawing showing the radius of curvature and other parameters pertaining to the wide-angle lens system 200 of the second embodiment;

FIGS. 7A through 7C consist of graphs showing the spherical aberration, astigmatism and distortion characteristics of the wide-angle lens system 200 of the second embodiment;

FIG. 9 is an explanatory drawing showing the radius of curvature and other parameters pertaining to the wide-angle lens system 300 of the third embodiment;

FIGS. 10A through 10C consist of graphs showing the spherical aberration, astigmatism and distortion characteristics of the wide-angle lens system 300 of the third embodiment;

DESCRIPTION OF THE PREFERRED EMBODIMENTS

Figure 1:
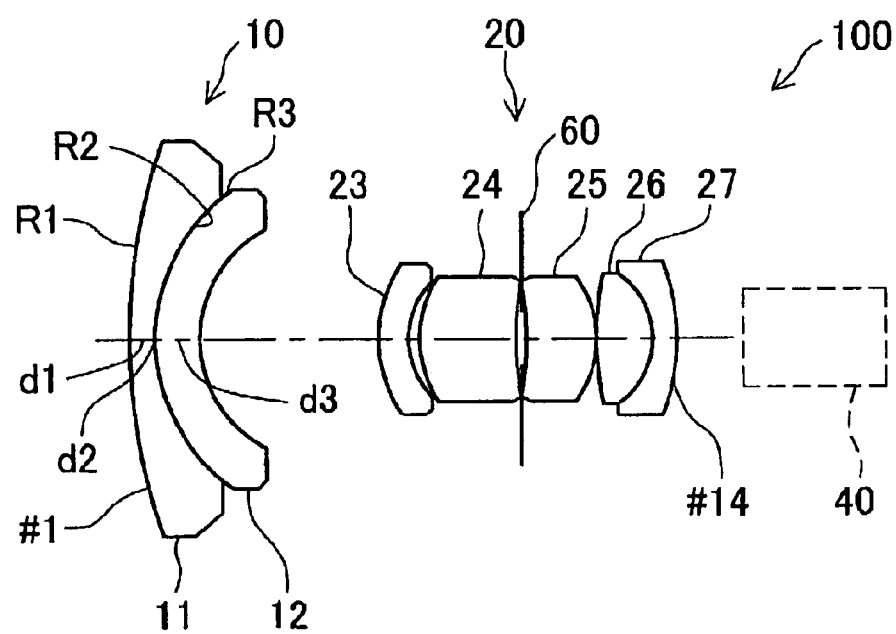
FIG. 1 is an explanatory drawing showing the construction of a wide-angle lens system 100 comprising a first embodiment.

Embodiments of the present invention will be described below based on examples. FIG. 1 shows the construction of a wide-angle lens system 100 that comprises one embodiment of the present invention. This wide-angle lens system 100 comprises a first lens group 10 that is disposed on the object side and has an overall negative refractive power, and a second lens group 20 that is disposed on the image side, includes an aperture 60 and has an overall positive refractive power. A CCD camera 40 indicated by a dashed line in the figure is disposed behind the wide-angle lens system 100. In an actual construction, the wide-angle lens system 100 and the CCD camera 40 would be stored in a housing, but because such a representation would render description of the lens system unduly complex, an actual example of such a housing will be described at the end of the discussion of the embodiments.

The first lens group 10 comprises a first meniscus lens 11 and a second meniscus lens 12, both of which are formed from glass. The second lens group 20 is disposed on either side of the aperture 60, with a third lens 23 and a fourth lens 24 disposed on the first lens group 10 side of the aperture 60 and a fifth lens 25 and a sixth lens 26 disposed on the CCD camera 40 side of the aperture 60. In the description below, the lens surface numbers #1, #2 and the like pertain to the lenses in the first and second lens groups, such that the lens surface of the lens 11 that is closest to the object is termed lens surface #1, the image side surface of the lens 11 is termed lens surface #2, the object side lens surface of the next lens 12 is termed lens surface #3, and the image side surface of the final lens 27 is termed lens surface #14. The aperture 60 is incorporated in this numbering system, and is described as the lens surface #9 in FIG. 2. Consequently, the object side lens surface of the fifth lens 25 is termed #10, the image side lens surface is termed #11, and so on. Furthermore, the object side lens surface of the final and seventh lens and the image side lens surface of the previous sixth lens 26 are bonded together, and comprise a single lens surface #13. In addition, the radii of curvature of the lens surfaces #1, #2, #3 and so on are expressed as R1, R2, R3 and so on (R constituting a symbol representing the radius of curvature) Similarly, the distance between lens surfaces is expressed by d1, d2, d3 and so on ((d)constituting a symbol representing distance).

FIG. 2 shows the characteristics of the lens surfaces of each lens of the wide-angle lens system 100 shown in FIG. 1. In the characteristics shown in the figure, the radius of curvature R is a positive value when the lens surface is convex on the object side. Therefore, a minus sign indicates that the lens surface is convex on the image side. Furthermore, the symbol (d) indicates the distance between the lens surface and the next lens surface along the optical axis (in units of millimeters). Therefore, the distance d1 for the lens surface #1 indicates the distance between the lens surface #1 and the lens surface #2 (i.e., the thickness of the lens 11), and the distance d2 indicates the distance between the lens surface #2 of the lens 11 and the lens surface #3 of the lens 12.

In FIG. 2, the symbol Nd indicates the refractive index for each lens at the d-line (wavelength 587.56 nm), while the symbol ν d indicates the Abbe number (dispersion) at the d-line. The presence of an asterisk before a lens surface number indicates that the surface is aspherical. Aspherical surface data is defined in terms of coefficients A4, A6, A8 and A10, which are coefficients used in the following equation (1) to define the configuration of the aspherical lens.

$$x = CH^2/(1+(1-(1+K)C^2H^2)^{1/2}) + A4H^4 + A6H^6 + A8H^8 + A10H^{10} \quad (1)$$

Figure 3:
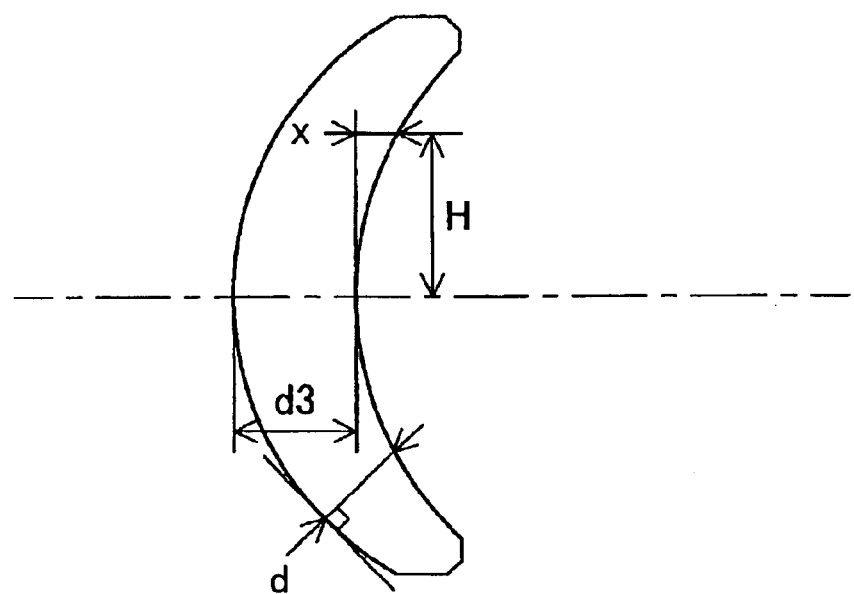
FIG. 3 is an explanatory drawing showing the relationship between the variables H and (x) in an equation governing a curved surface of an aspherical lens.

In the equation (1), K is a conical coefficient, C is the curvature (the inverse of the radius of curvature R), and H is the distance from the optical axis, and the equation (1) defines the position on the aspherical surface along the optical axis at a distance H from the optical axis. The aspherical surface is the lens surface #4 of the second lens 12, and the relationship between the distance H and the position (x) on this lens surface #4 is shown in FIG. 3 to aid in understanding. In FIG. 3, the thickness d3 of the second lens 12 along the optical axis and the thickness (d) along a normal line within the effective radius are shown as well in order to aid in understanding the equation given below. The effective diameter of the second lens 12 is defined in relation to the light exit side, i.e., the lens surface #3 side.

The wide-angle lens system 100 shown in FIG. 1 is designed for use in a so-called ⅓" CCD camera. The focal length (f) for all lens groups is 3.0 mm, the F-number is 3.0, and the half-field angle is 46°. In this wide-angle lens system 100, the following conditions apply to the first lens group 10:

$1 < d/d3 < 1.2$ $R3/R2 = 0.99$ $d2/f = 0.03$ \quad (2)

Here, (d) indicates the thickness of the second lens 12 along the normal line at a given distance from the optical axis within the maximum effective diameter of the object side convex surface of the lens. d3 is the thickness of the second lens 12 along the optical axis, as described above.

Figure 4C:
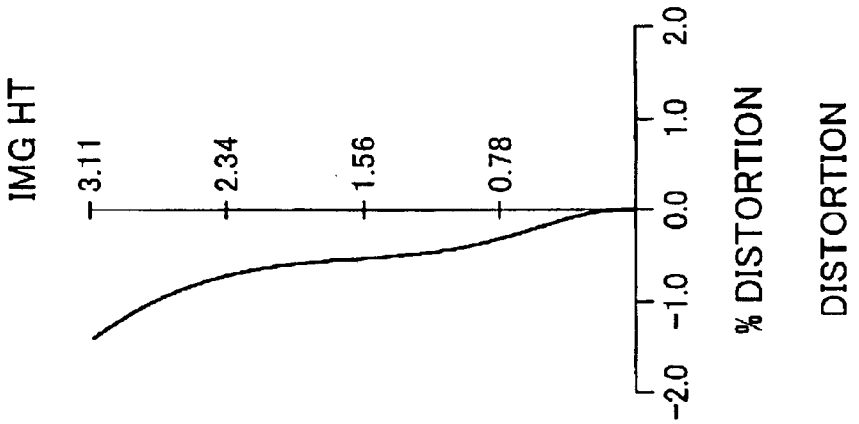
FIGS. 4A through 4C consist of graphs showing the spherical aberration, astigmatism and distortion characteristics of the wide-angle lens system 100 of the first embodiment.
Figure 4B:
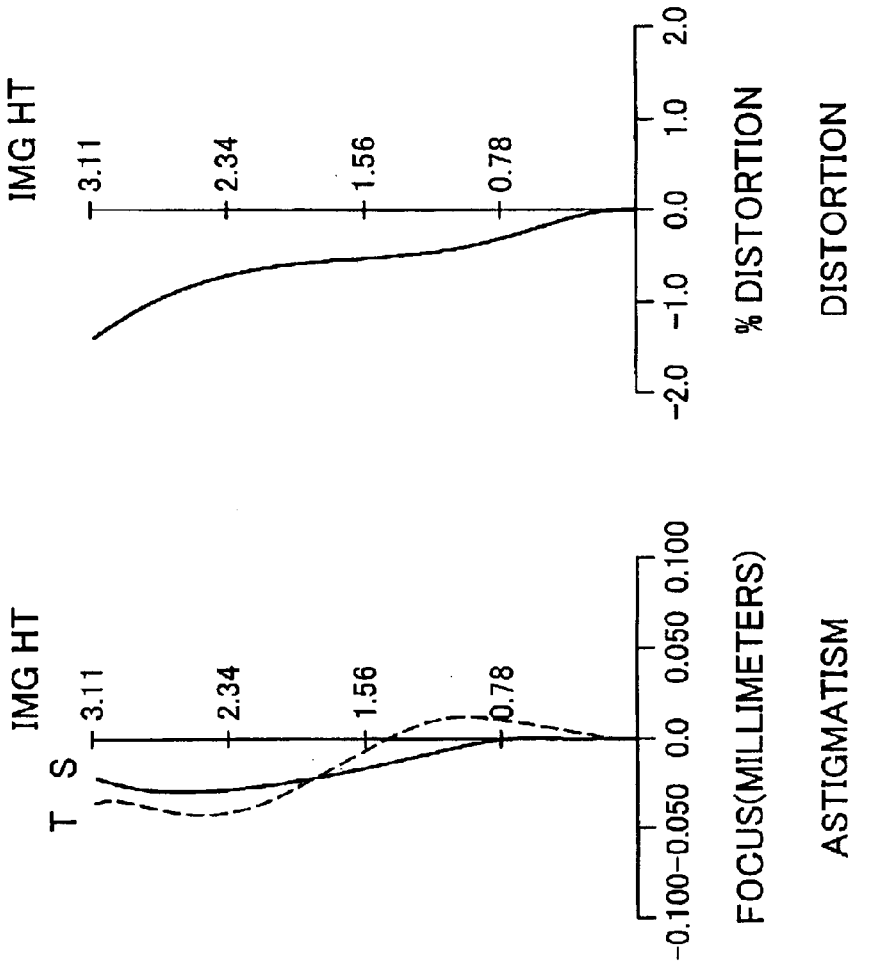
Figure 4A:
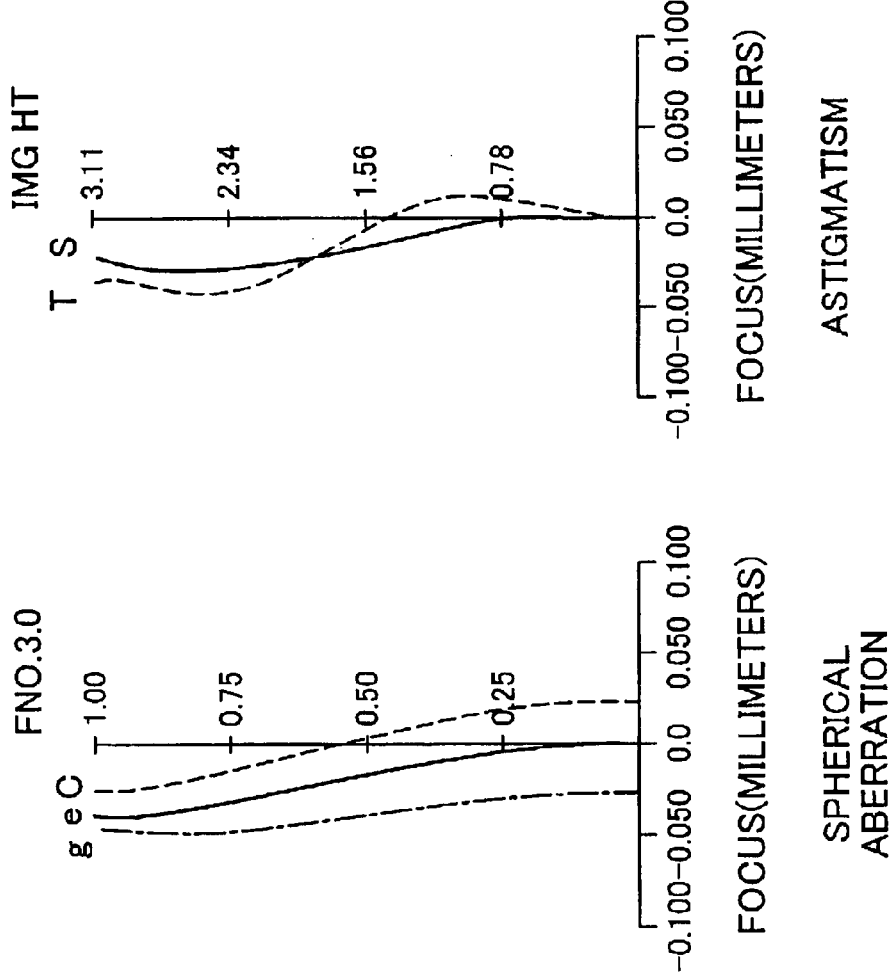
Figure 14A:
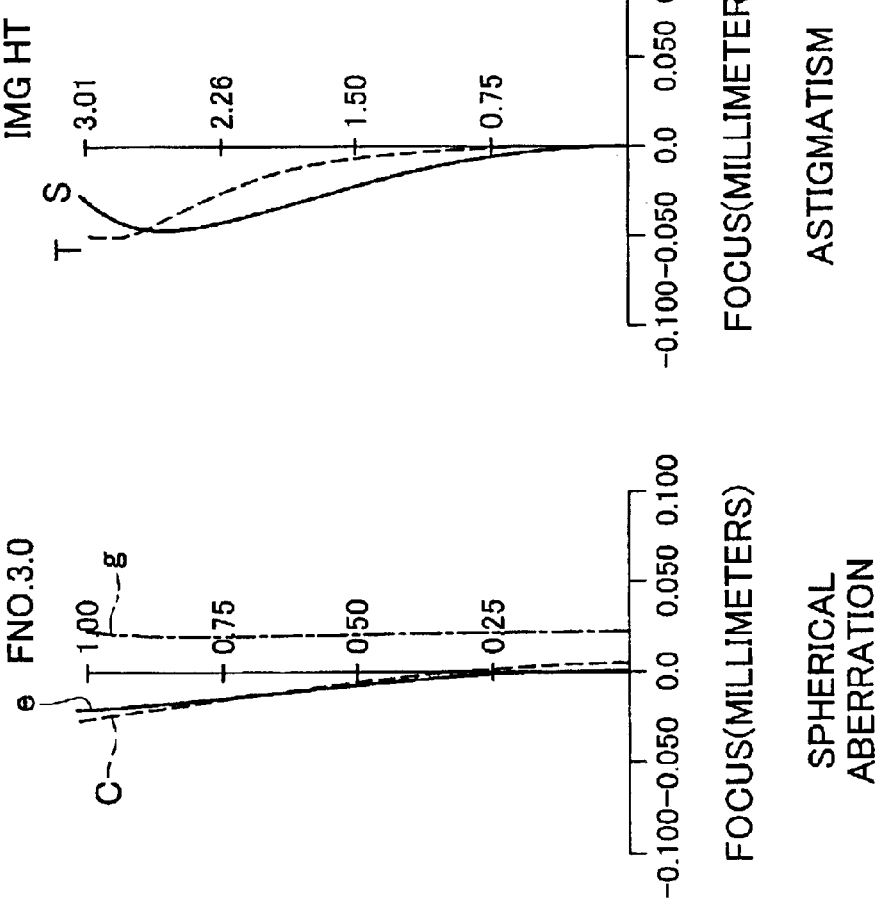
FIGS. 14A trough 14C consist of graphs showing the spherical aberration, astigmatism and distortion characteristics of the conventional wide-angle lens system.
Figure 14B:
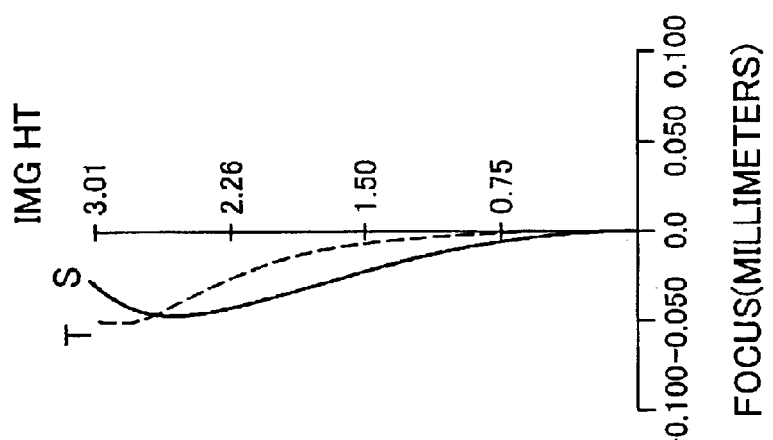
Figure 14C:
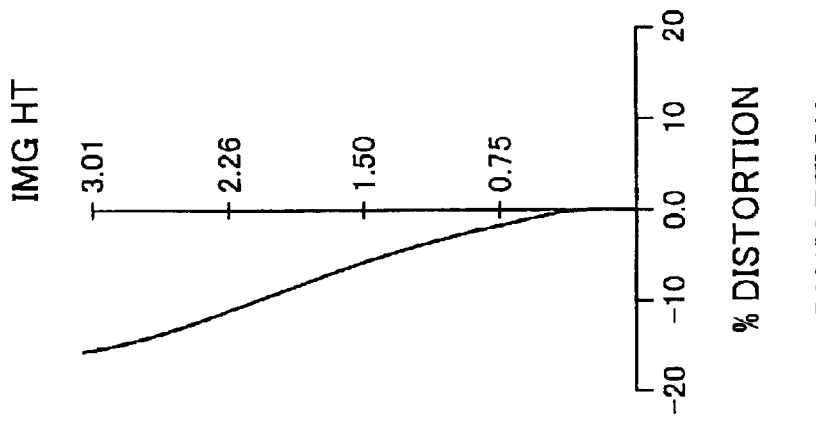

FIG. 4 shows the various characteristics of the wide-angle lens system 100 of the first embodiment having the above construction. In FIG. 4, (A) shows the amount of spherical aberration in relation to the F-number, and (B) shows the amount of vertical astigmatism in the image forming surface. The symbols (C), (e) and (g) in FIG. 4(A) indicate the different light wavelengths used in order to seek the respective aberrations (C-line: 656.3 nm, e-line: 546.1 nm, g-line: 435.8 nm). The symbol T in FIG. 4(B) indicates that the characteristic pertains to tangential light rays, while the symbol S indicates that the characteristic pertains to sagittal light rays (and this shall apply to the discussion below as well). FIG. 4(C) shows the amount of vertical distortion in the image forming surface. The same symbols are used in FIG. 14 showing the characteristics of the conventional wide-angle lens system. However, the horizontal axes in FIGS. 4(C) and 14(C) indicate the amount of distortion. In addition, the scale of the horizontal axis differs by a factor of 10 in FIG. 4 and FIG. 14. Therefore, a given position in FIG. 14(C) represents an amount of distortion that is 10 times the amount represented by the corresponding position on the other figure (i.e., the distortion in the wide-angle lens system of the embodiment is 1/10 of the distortion in the conventional art).

As shown in the figures, using the wide-angle lens system 100 of this embodiment, a back focal length that is sufficient to permit incorporation of the CCD camera 40 or the like is maintained while the lens size in the radial direction, and spherical aberration, astigmatism and distortion of the lens system as a whole, are kept small. Furthermore, the variation in the thickness of the second lens 12 comprising an aspherical lens is limited to 20% within the effective diameter of such lens, enabling the aspherical lens 12 to be manufactured more easily. Because the lens system as a whole does not include lenses with a complex configuration or lenses that are difficult to manufacture, the entire wide-angle lens system 100 is also easy to manufacture. With regard to the second lens 12 in particular, because the radius of curvature and the lens thickness of such lens must satisfy the above conditions (2), the lens can be molded from synthetic resin, which is preferred. This wide-angle lens system 100 can be used together with a CCD camera in a video camera or a document display device. In particular, because the wide-angle lens system 100 has low vertical distortion in the image forming surface, if it is used in a document display device that is often used to image small letters or characters, the low distortion over the entire screen allows the letters or characters to be imaged and displayed clearly.

Figure 5:
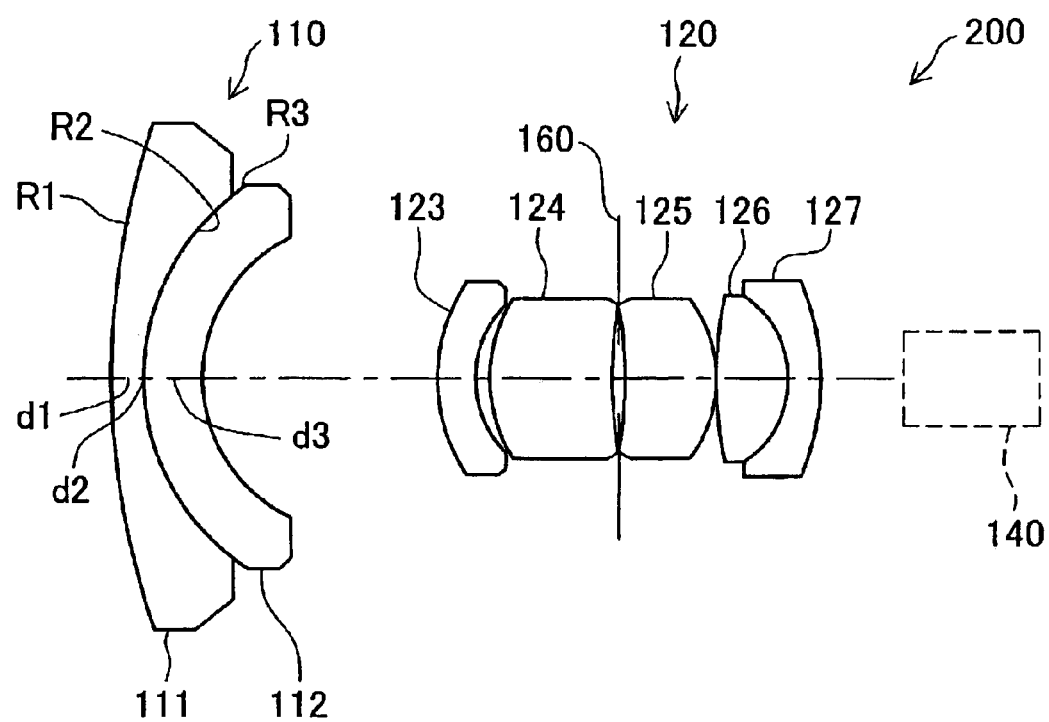
FIG. 5 is an explanatory drawing showing the construction of a wide-angle lens system 200 comprising a second embodiment.

A second embodiment of the present invention will now be described. As shown in FIG. 5, the wide-angle lens system 200 of the second embodiment comprises a first lens group 110 (lenses 111 and 112) and a second lens group 120 (lenses 123 through 127), and the lenses comprising these lens groups are essentially identical to those described in connection with the first embodiment. The wide-angle lens system 200 of the second embodiment is designed for use in a so-called ½" CCD camera 140, and the basic constructions of the lens groups are essentially identical to those described in connection with the first embodiment. FIG. 6 shows various parameters pertaining to the lenses of the second embodiment. The symbols used therein are identical to the symbols used in connection with the first embodiment. The focal length (f) for all lens groups of the wide-angle lens system 200 is 4.0 mm, the F-number is 3.0, and the half-field angle is 45.1°. The values for d/d3, R3/R2, d2/f and the like are identical to those in the conditions (2) for the first embodiment.

FIG. 7 shows the characteristics of this wide-angle lens system 200. The symbols used in the figure are identical to those used in connection with the first embodiment. As shown in the figure, the wide-angle lens system 200 has essentially the same characteristics as the wide-angle lens system 100 described in connection with the first embodiment. Consequently, the wide-angle lens system 200 maintains a back focal length sufficient to permit incorporation of the CCD camera 140 or the like therein while its size in the radial direction small is kept small, and the lens system as a whole has a low amount of spherical aberration, astigmatism and distortion. As with the first embodiment, its component lenses can be easily manufactured and it can be advantageously used as a document display device due to its low distortion.

Figure 8:
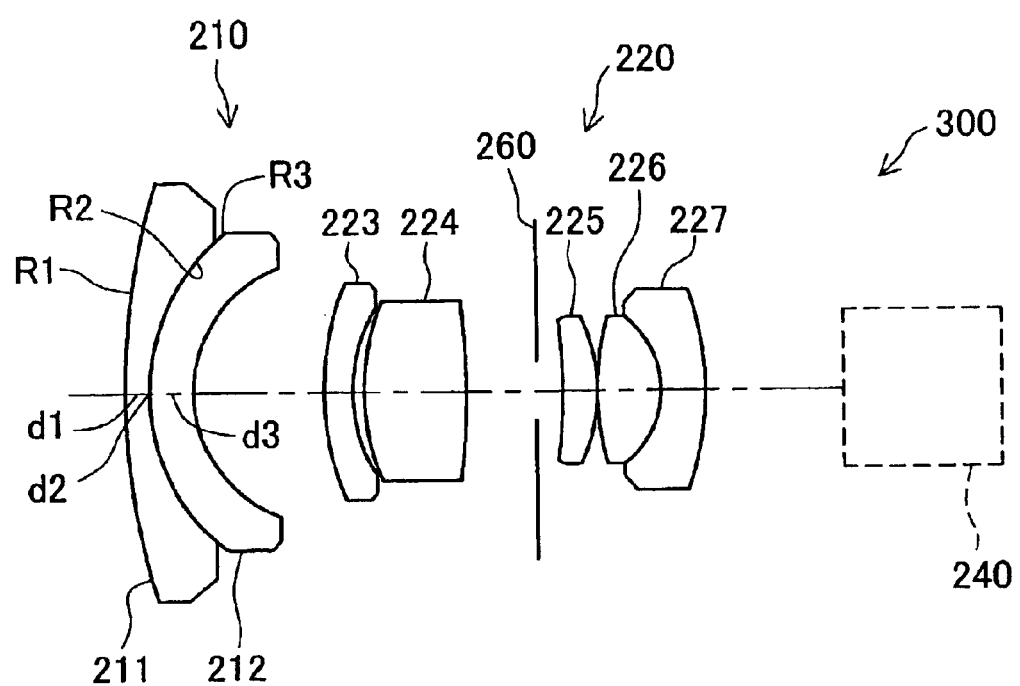
FIG. 8 is an explanatory drawing showing the construction of a wide-angle lens system 300 comprising a third embodiment.

A third embodiment of the present invention will now be described. FIG. 8 shows the lens construction of a wide-angle lens system 300 of the third embodiment, which is designed for use in a so-called ⅓" CCD camera 240. As shown in the figure, the basic constructions of the lens groups of the wide-angle lens system 300 comprising a first lens group 210 (lenses 211 and 212) and a second lens group 220 (lenses 223 through 227) are identical to the constructions employed in the first and second embodiments except that the second lens 212 is made of synthetic resin, but in this embodiment, a variable aperture mechanism 260 is disposed at the aperture position of the second lens group 220. Whereas the aperture 60 in the first and second embodiments was a fixed aperture with a small thickness, the variable aperture mechanism 260 is thicker due to incorporation of the variable aperture mechanism. As a result, in this embodiment, the distance d8 separating the aperture 60 (i.e., the surface #9) from the lens surface #8 of the fourth lens 224 is approximately 2.6 mm. Because the distance between the aperture 60 and the lens surface #10 of the fifth lens 25 is 1 mm, the distance separating the fourth lens 24 from the fifth lens 25 is 3.6 mm.

FIG. 9 shows various parameters pertaining to the wide-angle lens system 300 of the third embodiment. The symbols used therein are identical to those used in connection with the first and second embodiments. The focal length (f) for all lens groups of the wide-angle lens system 300 is 3.0 mm, the F-number is 3.0, and the half-field angle is 45.5°. The values for d/d3, R3/R2, d2/f and the like are essentially identical to those in the conditions (2) regarding the first embodiment (i.e., the differences are limited to the digits below the significant digits).

FIG. 10 shows the characteristics of the wide-angle lens system 300. As shown in the figure, the wide-angle lens system 300 of this embodiment has an extremely low spherical aberration, and the values for astigmatism and distortion are also sufficiently small for practical application. As a result, the wide-angle lens system 300 can also maintain a back focal length sufficient to permit incorporation of a CCD camera 240 or the like therein while its size in the radial direction is kept small. As with the first embodiment, its component lenses can be easily manufactured and it can be advantageously used as a document display device due to its low distortion.

Figure 11:
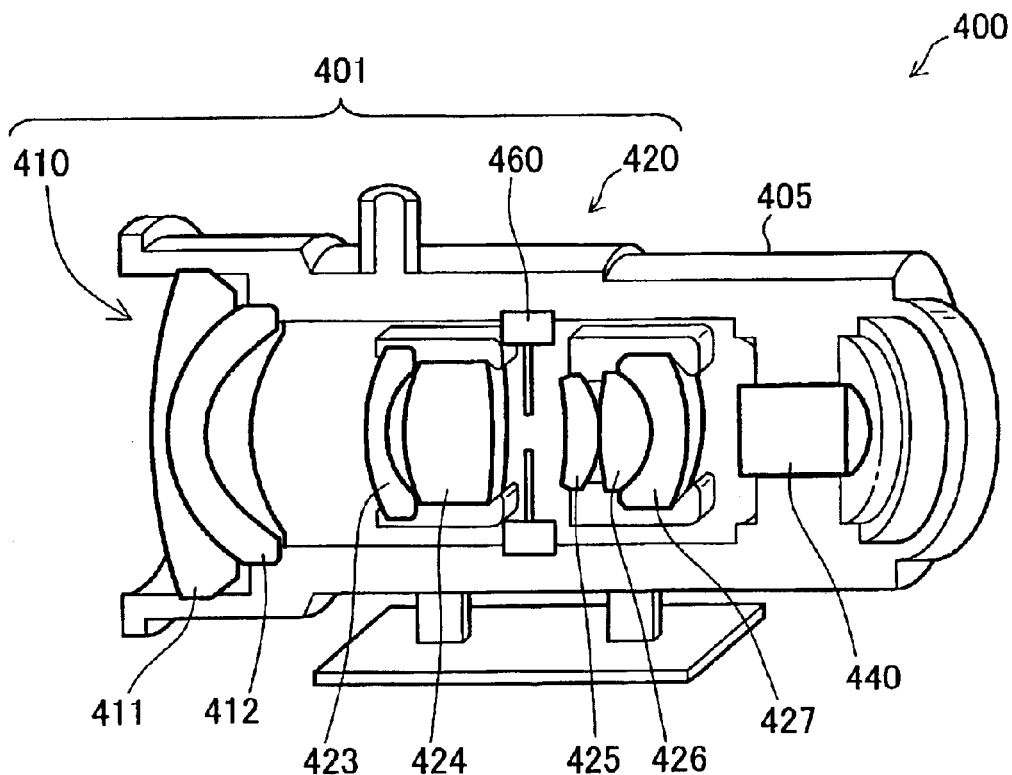
FIG. 11 is an explanatory drawing showing the basic construction of a video camera 400 in which a wide-angle lens system 401 comprising a fourth embodiment is incorporated.

The construction of a video camera 400 in which the wide-angle lens system 100, etc. of the various embodiments described above is incorporated will now be described. FIG. 11 is an overall construction diagram of the video camera 400 in which the wide-angle lens system of the embodiments is incorporated. Housed in the plastic case 405 of this video camera 400 is a wide-angle lens system 401 including a first lens group 410 that is disposed on the object side and has an overall negative refractive power and a second lens group 420 that is disposed on the image side of the first lens group 410 and has an overall positive refractive power. The first and second lens groups 410 and 420 are essentially identical to the lens groups described in connection with the third embodiment. Therefore, the divergence between the image side radius of curvature R12 of the first lens 411 and the object side radius of curvature R21 of the second lens 412 is set to fall within a prescribed range. The deviation between the difference d2 between the radii of curvature of the first and second lenses 411 and 412 along the optical axis and the focal length (f) of the lens system comprising the first lens group 410 and the second lens group 420 is set at approximately 0.03. The first and second lenses 411 and 412 are formed as described above, and they are disposed in an adjacent fashion in that order from the object side such that they are convex on the object side. The first and second lenses 411 and 412 are then housed and fixed within the case 405. A fixing mechanism is disposed in the case 405 in order to permit the second lens group 420 to be included therein while being separated from the image side of the first lens group 410 by a prescribed distance. In addition, a ⅓" CCD camera 440 is fixed and housed in the case 405 on the image side of the second lens group 440.

Figure 12:
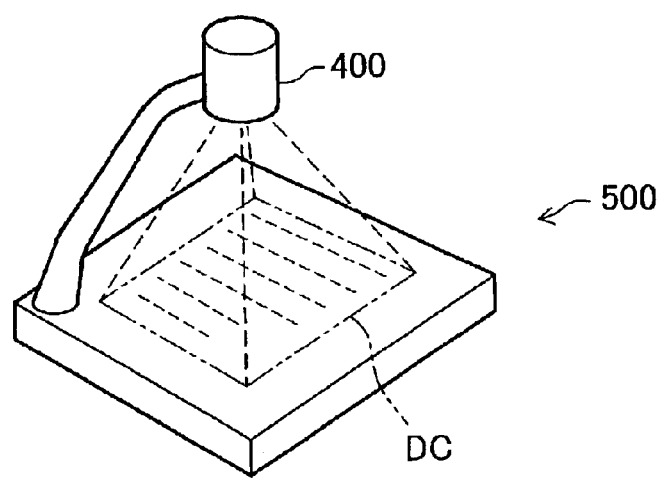
FIG. 12 is an external perspective view of a document display device 500 in which the video camera 400 is used.
Figure 13:
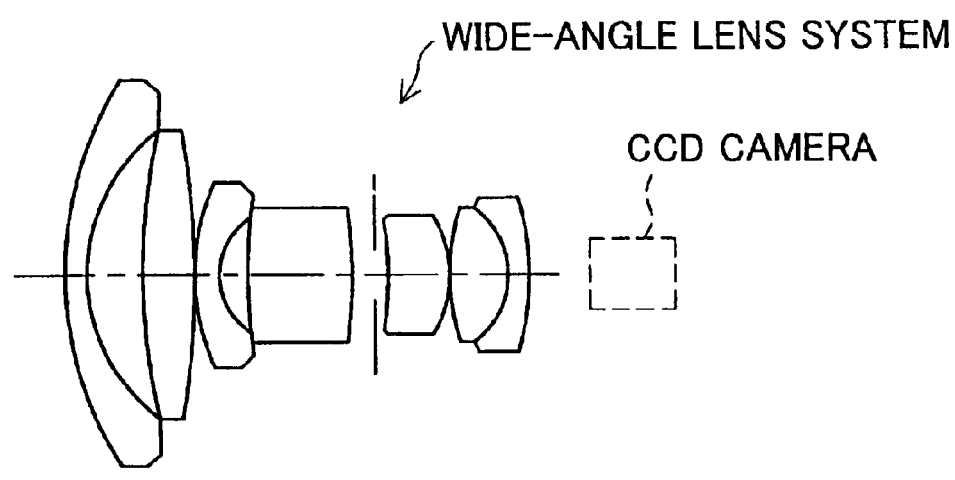
FIG. 13 is an explanatory drawing showing the construction of a conventional wide-angle lens system.

According to the video camera 400 manufacturing method described above, a video camera in which a back focal length sufficient to permit incorporation of a device is maintained and in which a wide-angle lens system having low distortion, astigmatism and spherical distortion is incorporated can be easily manufactured. The video camera obtained in this way can be incorporated in a document display device 500, as shown in FIG. 12, and used for document imaging, for example. Because the document display device 500 is often used for imaging of documents containing small letters or characters such as the document DC, a device such as the video camera 400 of this embodiment, which has low distortion at the periphery of the imaging area in particular, is extremely useful.

While embodiments of the present invention were described above, the present invention is not in any way limited to these embodiments, and can naturally be implemented in various forms within the essential scope of the invention. For example, the first lens 11 or the like of the wide-angle lens system of these embodiments may be made of synthetic resin. Furthermore, the camera incorporating such wide-angle lens system may also be used as a home video camera or a professional video camera, as well as in a document display device.

What is claimed is:

1. A wide-angle lens system comprising:
   a first lens group that is located on the object side and has an overall negative refractive power; and
   a second lens group that is located on the image side of the first lens group and has an overall positive refractive power,
   wherein said first lens group comprises first and second lenses formed as meniscus lenses that are disposed next to each other in that order from the object side and are convex on the object side, the image side concave surface of said second lens is aspherical and the variation in the thickness (d) of said second lens within its effective radius is set to fall within a first prescribed range, the divergence between the radius of curvature R12 on the image side of said first lens and the radius of curvature R21 on the object side of said second lens is set to fall within a second prescribed range, and the deviation between the difference d2 between the radii of curvature of said first and second lenses along the optical axis and the focal length (f) of the lens system comprising said first lens group and said second lens group is set so as not to exceed a prescribed value, and
   wherein, where the thickness of said second lens along the optical axis is deemed d0 and the thickness along the normal line at a given distance from the optical axis within the effective radius is deemed (d), the variation in the thickness of said second lens is defined as d/d0, for which said first prescribed range is 0.8 to 1.2 (0.8<d/d0<1.2) the divergence between the radii of curvature of said first and second lenses is defined as R21/R12, for which said second prescribed range is 0.9 to 1.1 (0.9<R21/R12<1.1), and the deviation between the difference d2 between the radii of curvature of said first and second lenses along the optical axis and said focal length (f) is defined as d2/f, for which said prescribed value is 0.2 (d2/f<0.2).

2. The wide-angle lens system in accordance with claim 1, wherein said second lens system groun has an aperture.

3. The wide-angle lens system in accordance with claim 2, wherein the second lens group comprises a plurality of lenses which make up two lens groups that are separated by said aperture and disposed on either side thereof.

4. The wide-angle lens system in accordance with any one of claims 1, 2 and 3, wherein the first lens of said first lens group is made of glass and is formed by polishing.

5. The wide-angle lens system in accordance with claim 1, wherein the second lens of said first lens group is made of synthetic resin and is formed by molding.

6. A method for manufacturing a wide-angle lens system that comprises a first lens group that is located on the object side and has an overall negative refractive power and a second lens group that is located on the image side of the first lens group and has an overall positive refractive power,
   wherein said first lens group is composed of a first lens being disposed on the object side and a second lens having an aspherical concave surface and a thickness (d) within the effective radius of the lens that is set to fall within a first prescribed range, both of said lenses being meniscus lenses, the first and second lenses are formed such that the divergence between the radius of curvature R12 on the image side of said first lens and the radius of curvature R21 on the
   object side of said second lens is set to fall within a second prescribed range, and the deviation between the difference d2 between the radii of curvature of said first and second lenses along the optical axis and the focal length (f) of the lens system comprising said first lens group and said second lens group is set so as not to exceed a prescribed value, said first lens group is formed by arranging said first and second lenses in an adjacent fashion in that order from the object side such that they are convex on the object side, and said second lens group is disposed on the image side of said first lens group while being separated therefrom by a prescribed distance; and
   wherein, where the thickness of said second lens along the optical axis is deemed d0 and the thickness along the normal line at a given distance from the optical axis within the effective radius is deemed (d) the variation in the thickness of said second lens is defined as d/d0, for which said first prescribed range is 0.8 to 1.2 (0.8<d/d0<1.2), the divergence between the radii of curvature of said first and second lenses is defined as R21/R12, for which said second prescribed range is 0.9 to 1.1 (0.9<R21/R12<1.1), and the deviation between the difference d2 between the radii of curvature of said first and second lenses along the oDtical axis and said focal length (f) is defined as d2/f, for which said prescribed value is 0.2 (d2/f<0.21).

7. An optical device comprising:

a wide-angle lens system; and a CCD camera disposed behind said wide-angle lens system, wherein said wide-angle lens system comprises a first lens group that is located on the object side and has an overall negative refractive power, and a second lens group that is located on the image side of the first lens group and has an overall positive refractive power;

wherein said first lens group comprises first and second lenses formed as meniscus lenses that are disposed next to each other in that order from the object side and are convex on the object side, the image side concave surface of said second lens is aspherical and the variation in the thickness (d) of said lens within its effective radius is set to fall within a first prescribed range, the divergence between the radius of curvature R12 on the image side of said first lens and the radius of curvature R21 on the object side of said second lens is set to fall within a second prescribed range, and the deviation between the difference d2 between the radii of curvature of said first and second lenses along the optical axis and the focal length (f) of the lens system comprising said first lens group and said second lens group is set so as not to exceed a prescribed value; and wherein, where the thickness of said second lens along the ontical axis is deemed d0 and the thickness alone the normal line at a given distance from the optical axis within the effective radius is deemed (d), the variation in the thickness of said second lens is defined as d/d0, for which said first prescribed range is 0.8 to 1.2 (0.8<d/d0<1.2), the divergence between the radii of curvature of said first and second lenses is defined as R21/R12, for which said second prescribed ranae is 0.9 to 1.1(0.9<R21/R12<1.1), and the deviation between the difference d2 between the radii of curvature of said first and second lenses alone the optical axis and said focal length (f) is defined as d2/f, for which said prescribed value is 0.2 (d2/f<0.2).

8. An optical device in accordance with claim 7, said device further comprising:

an imaging unit in which said first and second lens groups and said CCD camera are incorporated;

a document platform disposed below said imaging unit, and a support unit that supports said imaging unit such that at least part of the document platform can be imaged.

9. The device in accordance with claim 7 or claim 8 wherein said second lens group of said wide-angle lens system has an aperture.

* * * * *